United States Patent [19]
La Belle

[11] Patent Number: 5,465,612
[45] Date of Patent: Nov. 14, 1995

[54] METHOD AND APPARATUS FOR TESTING MOTOR VEHICLES UNDER SIMULATED ROAD CONDITIONS

[75] Inventor: John T. La Belle, Long Beach, Calif.

[73] Assignee: Clayton Industries, El Monte, Calif.

[21] Appl. No.: 260,887

[22] Filed: Jun. 16, 1994

[51] Int. Cl.⁶ .................................................... G01L 3/22
[52] U.S. Cl. .................... 73/117; 73/862.13; 73/862.16
[58] Field of Search ........................ 73/117, 123, 126, 73/862.13, 862.16, 862.18

[56] References Cited

U.S. PATENT DOCUMENTS

| | | | |
|---|---|---|---|
| 4,161,116 | 7/1979 | Fegraus et al. | 73/117 |
| 4,327,578 | 5/1982 | D'Angelo | 73/117 |
| 4,656,576 | 4/1987 | Kawarabayashi | 364/148 |
| 4,745,799 | 5/1988 | Kawarabayashi et al. | 73/117 |
| 4,825,690 | 5/1989 | Mears | 73/117 |
| 5,078,008 | 1/1992 | Yagi et al. | 73/117 |
| 5,101,660 | 4/1992 | La Belle | 73/117 |
| 5,154,076 | 10/1992 | Wilson et al. | 73/117 |

OTHER PUBLICATIONS

Advantages of Using Microcomputers in Dynamometer Controllers Severino D'Angelo and R. D. Gafford Feb. 23–27, 1981.

Primary Examiner—Richard E. Chilcot, Jr.
Assistant Examiner—Eric S. McCall
Attorney, Agent, or Firm—Harold L. Jackson

[57] ABSTRACT

A chassis dynamometer includes at least one roll for engaging the driven wheel of a motor vehicle and a power supplying and/or absorbing unit ("PAU") coupled to the roll. Speed and force sensors are also coupled to the roll for providing signals representative of the roll speed and force supplied to or received from the roll, respectively. Vehicle inertia, road load and parasitic loss signals, representative of the vehicle inertia, the vehicle road load and dynamometer parasitic losses, respectively, are also provided. A processing unit, such as a computer, calculates a velocity error signal based on the above signals, representative of the difference between the desired and actual speed of the vehicle. The processing unit further generates a feed-forward signal in response to the speed and inertia signals, representative of at least a portion, and preferably one hundred percent, of the inertial force signal to be simulated by the PAU. A power controller in response to the feed-forward signal and the velocity error signal controls the PAU.

21 Claims, 2 Drawing Sheets

METHOD AND APPARATUS FOR TESTING MOTOR VEHICLES UNDER SIMULATED ROAD CONDITIONS

BACKGROUND OF THE INVENTION

1. Field of the Invention

This invention relates to an apparatus and method for testing motor vehicles under simulated road conditions.

2. Description of the Prior Art

Test apparatus in the form of dynamometers is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = Av + BvV + CvV2 + DW$$

where Av represents the vehicle constant load coefficient (e.g., effects of breakaway force), and, Bv and Cv represents the vehicle load coefficient dependent on velocity and velocity squared (e.g., windage), and D represents the grade coefficient (e.g., slope of the grade). It should be noted that a load coefficient based on velocity cubed may be added if desired). V represents the vehicle velocity and W represents the vehicle weight.

The purpose of the dynamometer is to impose those forces on the vehicle which the vehicle would incur during actual operation on a road. Chassis dynamometers for 2WD vehicles (front or rear axle drive) include a roll (or a pair of rolls) for engaging the driven wheels of the vehicle being tested. Chassis dynamometers for 4WD vehicles (front and rear axles coupled to the engine) include a roll or pair of rolls for supporting and engaging each pair of wheels (front and rear) with each pair of rolls being free to rotate independently and at different speeds or electrically (or mechanically) coupled so that all of the rolls rotate at the same speed. See U.S. Pat. No. 5,101,660 assigned to the assignee of this application.

Typically a power supplying and absorbing unit such as an electric motor (a.c. or d.c.) or a power absorbing unit such as a friction brake, eddy current brake or hydrokinetic brake is coupled to the roll or rolls for supplying power to and/or absorbing power from the roll(s) which in turn applies a force to the surface of the vehicle wheels (e.g., tires) to simulate the road load forces. Inertial forces can be simulated by power supplying and absorbing units during both acceleration and deceleration but can be simulated by power absorbing units only during acceleration. A power supplying and/or absorbing units is hereinafter referred to as a "PAU". Mechanical flywheels may be generally used in conjunction with PAU's to simulate a part (or in some instances substantially all) of the vehicle inertia. Vehicle velocity may be determined from the following speed control algorithm:

$$V_1 - V_0 = \int_{t_0}^{t_1} \frac{F-RL}{I} \, dt$$

where $V_1$=the computed velocity at time $t_1$, $V_0$=the velocity at time $t_0$, F=the measured force at the wheel/roll interface, I=the vehicle inertia to be simulated (e.g., vehicle weight in lb or Kg) and RL=the road load force and dt=the interval of integration. The implementation of this basic algorithm to control the operation of a dynamometer is explained in some detail in U.S. Pat. No. 4,161,116 ("'116 patent") also assigned to the assignee of this application.

The rotational velocity of the roll is representative of V and can be accurately measured by coupling a speed encoder of the optical or magnetic pulse type to the dynamometer roll. However, there is no force measuring device which, as a practical matter, can be placed between the rotating vehicle wheel and the roll. As a compromise, a force measuring device or transducer is generally placed either at the output of the PAU or between the flywheel assembly, if used, and the shaft connecting the flywheels to the roll. In either case, there are bearing friction and windage losses generated by the roll and/or flywheels which are not measured by the transducer. Such losses are commonly referred to as parasitic losses and must be compensated for in order to provide an accurate control signal for the power supplying and/or absorbing unit in the dynamometer.

A parasitic loss profile or curve of the lost force at the roll surface (due to parasitic losses) versus roll speed for the roll can be computed by measuring the force required to maintain the roll or rolls at several selected (e.g., four or more) speeds. A signal representative of the forces attributable to parasitic losses and the dynamometer out-of-loop inertia forces, if desired, must then be added to the force signal measured by the transducer to provide a force signal representative of F.

The use of the above algorithm in the control system provides a much faster response time than the older dynamometer control systems which relied on the differentiation of the measured velocity to develop a torque control signals as is discussed in some detail in the '116 patent. It has been discovered that the use of a feed-forward signal which represents all or a part of the selected vehicle inertia to be simulated by the PAU enhances the response time of dynamometer control systems based on the above algorithm by itself by several fold. The use of an overall feed-forward signal has been disclosed in connection with a torque control algorithm. See the 1981 *SAE Technicalpaper* No. 810749 entitled *Feed-Forward Dynamometer Controller for High Speed Inertia Simulation* and one of the author's U.S. Patents i.e., U.S. Pat. No. 4,327,578. However, the use of a feed-forward signal representing the inertia to be simulated with the above described velocity control algorithm is new and provides an unexpected improvement in performance.

SUMMARY OF THE INVENTION

In accordance with the present invention a chassis dynamometer apparatus for testing motor vehicles under simulated road conditions includes at least one roll for engaging the driven wheels of the vehicle. A PAU, such as an electric motor is coupled to the roll or rolls. Force sensing means is coupled to the roll to provide a force signal representative of the force supplied to or received from the vehicle wheels by the roll minus the forces attributable to the dynamometer parasitic losses and roll inertial forces.

Velocity sensing means is coupled to the roll for providing a signal representative of the speed of the roll. The apparatus further includes inertia and road load signal generators for providing signals which represent the simulated inertia and road load forces of the vehicle being tested. Means are also provided for generating a parasitic loss signal which represents the forces attributable to the parasitic losses of the dynamometer. In addition, an out-of-loop inertia and inside loop inertia signal generators may be provided. A velocity error signal generator provides a velocity error signal in response to the force signal, the parasitic loss signal, the road load signal and the measured velocity signal and the out-of-loop inertia signal (if desired).

A feed-forward signal generating means responsive to at least the vehicle acceleration and the inertia being simulated generates a feed-forward signal representative of at least a portion of the simulated inertial force required from the PAU. The PAU is controlled in response to the feed-forward signal and the velocity error signal.

The features of the present invention can be best understood by reference to the following description taken in conjunction with the accompanying drawings wherein like reference numerals indicate like components.

DESCRIPTION OF THE PREFERRED EMBODIMENT

Figure 1:
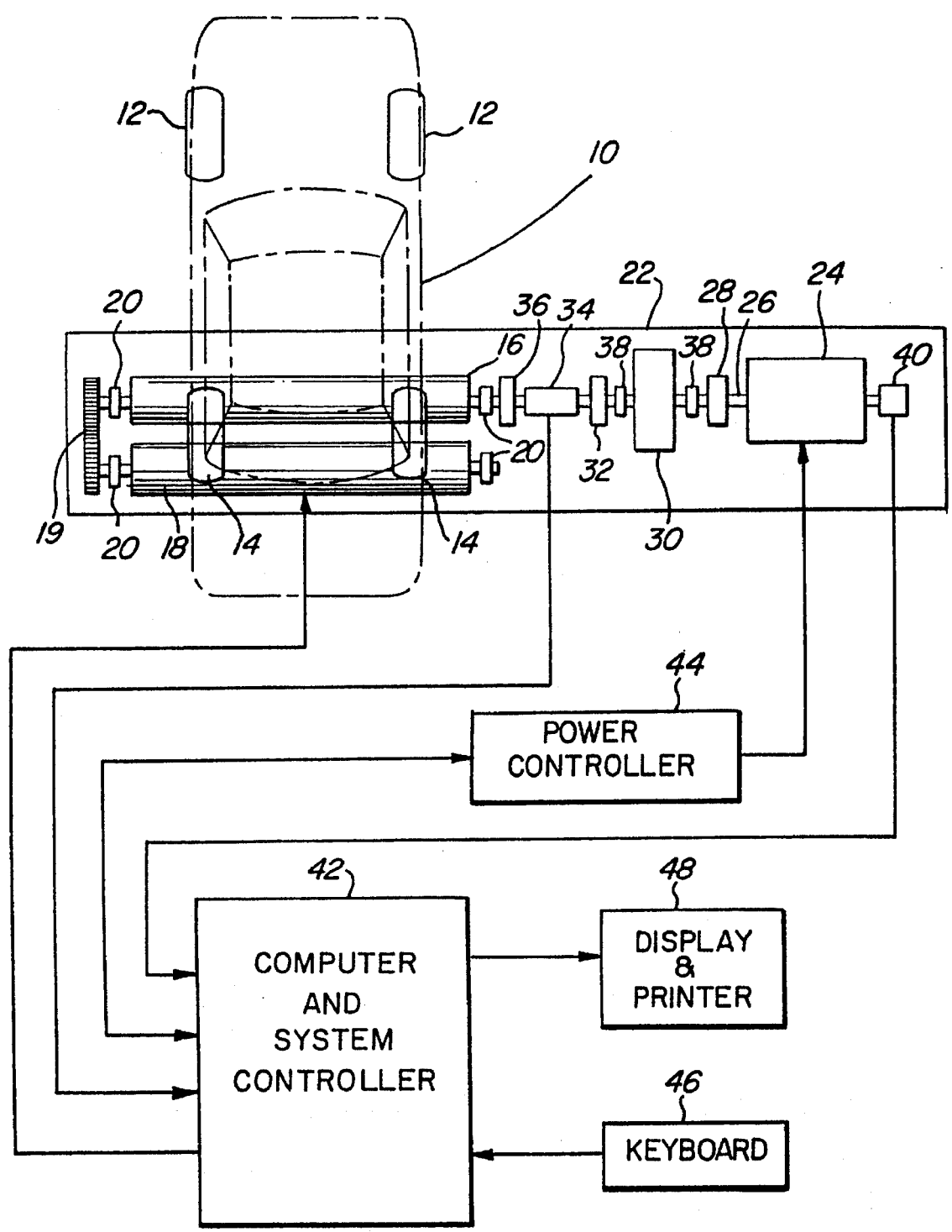
FIG. 1 is a diagrammatic plan view of a chassis dynamometer apparatus in accordance with the present invention.

Referring now to the drawings and particularly FIG. 1, there is illustrated a dynamometer apparatus for testing a 2 wheel drive ("2WD") vehicle 10 having front and rear wheels 12 and 14. The rear wheels (driven by the vehicle motor) are cradled between drive and idle rolls 16 and 18 in a conventional manner. Bearings 20 support both rolls on frame 22. A power supplying and absorbing unit 24 in the form of an electric motor (a.c. or d.c.) is coupled to the drive roll 16 through shaft 26, flexible coupling 28, mechanical flywheel 30, flexible couplings 32, torque transducer 34 and flexible coupling 36 as shown. Bearings 38 support the flywheel. A velocity encoder 40 is coupled to the drive roll shaft 26 for generating a velocity signal representative of the speed of the roll and the vehicle wheels in contact therewith. An idle roll 18 is coupled to the drive roll 16 via a clutched belt assembly 19. It should be noted that the flywheel is optional.

The rear vehicle wheels are raised above or lowered into the rolls by conventional means such as electrically actuated hydraulic lifts (not shown).

Signals from the torque transducer 34 and the velocity encoder 40 are supplied to a computer and system controller 42 which in turn supplies torque command signals to a power controller 44. The power controller in response to the torque command signal controls the motor 24 to supply power to or absorb power from the drive roll 16. For example, where d.c. motors are used, the power controller adjusts the armature current to cause the motor to drive or brake the drive roll. The computer 42 also controls conventional wheel lift and roll brake mechanisms through appropriate leads (not shown).

A keyboard 46 is connected to the computer 42 to allow an operator to input signals representative of the inertia and road load forces for the vehicle being tested. A video display and printer 48 allows the operator to display or printout test information in a conventional manner.

Figure 2:
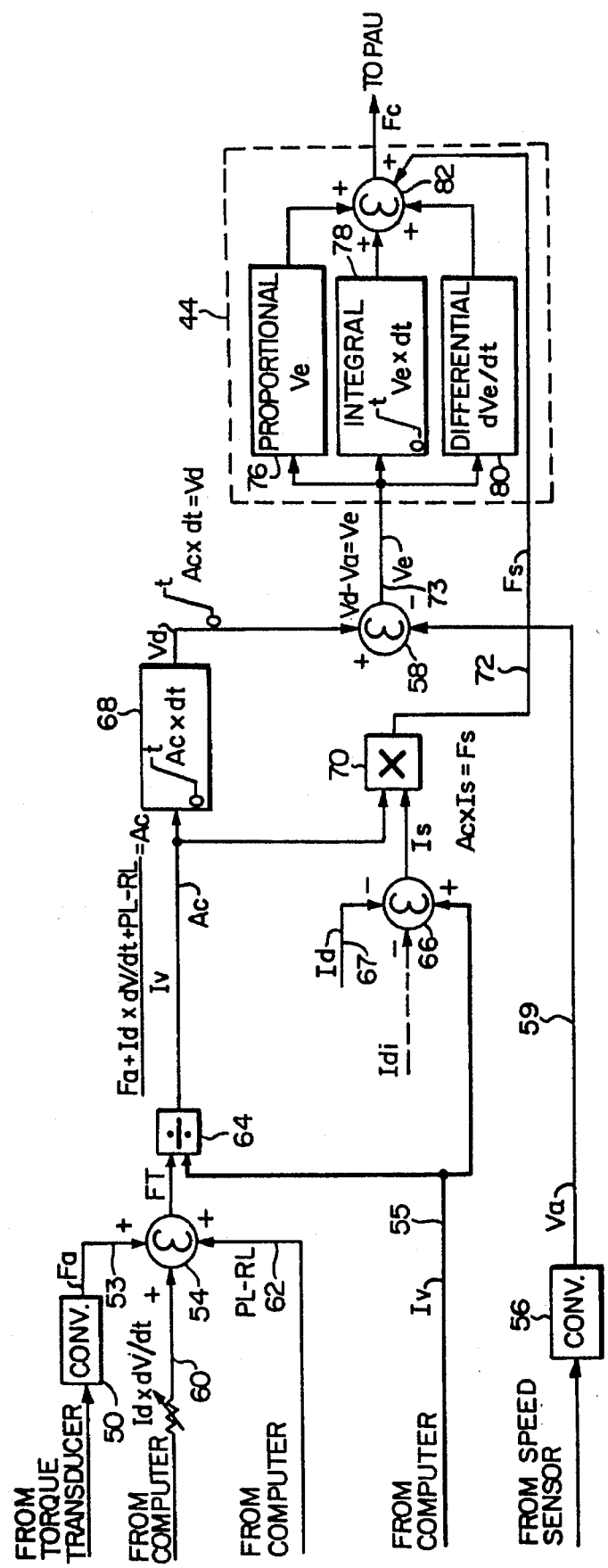
FIG. 2 is a block diagram of the Computer and System Controller of FIG. 1.

Referring now to FIG. 2, a converter circuit 50 converts the measured torque signal T from the sensor 34 into a signal Fa (Fm) representative of the measured or achieved force delivered to or received from the drive roll, by the vehicle wheels. The force signal Fa is applied to a summing element 54 via lead 53.

A converter circuit 56 conditions the signal from the speed sensor 40 to a measured or achieved speed signal Va representative of the roll and vehicle speed. The Va signal is applied to another summing element 58 via lead 59.

The computer multiplies a signal Id representing the dynamometer out-of-loop inertia by a signal dVa/dt representing the derivative of the achieved velocity signal to provide a signal Id dVa/dt representing a force attributable to the dynamometer out-of-loop inertia. It should be noted that this dynamometer out-of-loop inertia force signal may include the inertia of the rotating mass of the vehicle if desired. This out-of-loop inertia force signal is supplied to another input of summing element 54 via lead 60 as shown.

The computer also calculates the road load signal RL at the achieved velocity in accordance with the algorithm discussed previously. The road load signal minus a signal (PL) representing a force attributable to the dynamometer parasitic losses is applied to a third input of the summing element 54 via lead 62. The output of the summing element 54 is divided by a signal Iv on lead 55 representing the vehicle inertia in a divider element 64. The output of the divider 64 is a signal Ac representative of the calculated acceleration for the vehicle.

The vehicle inertia signal Iv is also supplied to another summing element along with a signal Id representative of the out-of-loop inertia of the dynamometer of lead 67. The output of the summing element 66 is a signal Is representing the magnitude of the inertia to be simulated by the PAU. It should be noted that any significant inertia existing within the dynamometer control loop (such as mechanical flywheels (and the inertia of the rotor of an electric motor) i.e., represented by the signal Idi, should also be subtracted from the vehicle inertia Iv in the summing element 66 to provide the inertia to be simulated by the PAU as is illustrated by the dashed line in FIG. 2. The signal Ac representing the vehicle acceleration is integrated in integrator 68 to provide an output signal Vd representing the desired velocity of the vehicle. The acceleration signal Ac is also multiplied by the inertia-to-be-simulated signal Is in multiplier 70 to provide the feed-forward force command signal Fs on lead 72 for the PAU power controller 44 as will be explained in more detail. It should be noted that forces which do not change rapidly, i.e., forces attributable to road load and parasitic losses need not be included in the feed-forward signal. To provide the improved response time it is essential that forces which change rapidly, i.e., inertial forces be included in the feed-forward signal.

The achieved or measured velocity signal Va is subtracted from the desired velocity signal Vd in summing element 58 to provide a velocity error signal Ve on lead 73. This error signal, in the form of negative feedback, is applied to a conventional PAU power or PID controller 44. The controller 44 comprises a 8 proportional circuit 76, a integrating circuit 78 and a differentiating circuit 80. A weighted summation circuit 82 receives the outputs from the circuits 76, 78 and 80 as well as the feed-forward signal Fs to provide an output force (or torque) command signal Fc which is supplied to the PAU's, e.g., the d.c. motor The terminology for the signals previously discussed and as shown in FIG. 2 are set forth below:

Fa=Force achieved
Fc=Force command
RL=Road load force at current velocity
PL=Parasitic loss force at current velocity
dV/dt=Current measured acceleration
Id=Out of loop dynamometer inertia
Idi=Inside of loop dynamometer inertia
Iv=Inertia of vehicle
Is=Inertia simulated by PAU
Fs=Simulated inertial force
FT=Summation of forces for ACD algorithm
Ac=Calculated Acceleration $$\int_o^t Ac\, dt = \text{Integral of calculated acceleration}$$

Va=Velocity achieved
Vd=Velocity desired
Ve=Velocity error

The feed-forward signal Fs represents a large portion of the simulated inertial force (or torque) required of the PAU. Optimally, Fs represents about 100% of such inertial force but may represent a lesser amount e.g., about 10%–90%. While the velocity error feedback signal Ve preferably accounts for only a small percentage of the force command signal to the PAU it is necessary to provide stability and accuracy.

A dynamometer control system in accordance with this invention has been tested with the result that the response time has been reduced to about 100 milliseconds as compared to several hundred milliseconds for a standard dynamometer employing the velocity error signal alone for controlling the PAU.

The response time of a dynamometer is critical in testing the vehicles under stringent emission standards such as those required by the U.S. Environmental Protection Agency ("EPA"). The use of this control system allow dynamometers (which would not otherwise qualify) to qualify for the latest EPA testing procedures.

It should be noted that the terms "driven roll or rolls" (or like terms) as used herein shall mean the roll or rolls which are driven by the vehicle at least during acceleration and constant speed operation. It is to be understood that such rolls will transfer power to (or drive) the vehicle wheels during braking and motor deceleration.

Various modifications of the apparatus or a variation in the method steps will occur to persons skilled in the art without departing from the spirit and scope of the invention as described in the appended claims.

What is claimed is:

1. A dynamometer apparatus for simulating an inertia and road load for a motor vehicle having at least one front and one rear wheel with at least one of the wheels being driven, comprising:

at least one roll for engaging the driven wheel of the vehicle;

a power supplying and/or absorbing unit, PAU, coupled to a driven roll, the driven roll applying a force to or receiving a force from an associated wheel in accordance with a power supplied or absorbed by the PAU;

force sensing means coupled to the driven roll, for providing a measured force signal Fm which is a function of the force supplied to or received from the vehicle wheel by the roll minus and the force attributable to parasitic losses associated with a dynamometer, the force attributable to the out-of-loop inertia of the dynamometer;

velocity sensing means coupled to the driven roll, for providing a measured speed signal Va which is a function of the speed of the roll and vehicle;

means for generating a vehicle inertia signal Iv which is a function of the force attributable to the inertia to be simulated for the vehicle being tested;

means for generating a road load signal RL which is a function of road load load forces for the vehicle;

means for generating a dynamometer parasitic loss signal PL which is a function of the force attributable to the parasitic losses of the dynamometer;

means responsive to the velocity signal, the measured force signal, the parasitic loss signal, the inertia signal and the road load signal for providing a velocity error signal Ve;

means responsive to at least the velocity signal and the inertia signal for providing a feed-forward signal Fs representative of at least a portion of the simulated inertial force required from the PAU; and means responsive to the velocity error signal and the feed-forward signal for controlling the PAU.

2. The invention of claim 1 wherein the means for providing the velocity error signal includes means for generating a velocity calculated signal Vc in accordance with:

$$Vc = \int_o^t \frac{Fm + PL - RL}{Iv}\, dt$$

where:

dt=an interval of integration.

3. The invention of claim 2 wherein the road load signal generating means is responsive to the measured speed signal of the driven roll and provides a road load signal in accordance with:

$$RL = Av + BvV + CvV^2 + DvW$$

where:

RL=the road load signal;
   V=measured speed signal; and
   W=vehicle weight; and
   Av, Bv, Cv, and Dv are constants.

4. The invention of claim 2 wherein the feed-forward signal providing means is responsive to a acceleration signal Ac of the vehicle and the vehicle inertia to be simulated by the PAU.

5. The invention of claim 4 wherein the feed-forward signal is representative of 10 to 100% of the simulated inertia force required from the PAU.

6. The invention of claim 2 wherein $$Ve = Va - \int_o^t \frac{Fm + PL - RL}{Iv} \, dt$$

7. The invention of claim 5 further including means for generating an out-of-loop inertia signal Id which is a function of the out-of-loop inertia of the dynamometer and wherein the means for generating the velocity error signal Ve is further responsive to Id dVa/dt.

8. The invention of claim 7 wherein the parasitic loss signal generating means in response to the measured velocity signal provides a parasitic loss signal in accordance with:

$$PL = Ad + BdV + CdV^2 + DdV^3$$

Ad, Bd, Cd and Dd are dynamometer parasitic loss constants with the vehicle in place.

9. The invention of claim 8 wherein the PAU is an electric motor.

10. The invention of claim 9 wherein said at least one roll comprises a driven roll and an idler roll for cradling the driven wheels of the vehicle.

11. A dynamometer for simulating an inertia and road load for a motor vehicle having an engine comprising:

a power supplying and/or absorbing unit, PAU, coupled to the engine for applying a torque to or receiving a torque from the engine;

force sensing means coupled to the engine for providing a force achieved signal Fa which is a function of the torque supplied to or received from the PAU minus a force attributable to parasitic losses associated with the dynamometer, and a force attributable to an out-of-loop inertia of the dynamometer;

speed sensing means coupled to the engine for providing a speed achieved signal Va which is a function of engine speed;

means for generating a vehicle inertia signal Iv which is a function of a force attributable to the inertia to be simulated for the vehicle;

means for generating a road load signal RL which is a function of a road load force for the vehicle;

means for generating a dynamometer parasitic loss signal PL which is a function of the force attributable to the parasitic losses of the dynamometer;

means for generating an out of loop inertia signal Id representative of the out-of-loop inertia of the dynamometer;

means for providing a velocity error signal Ve in accordance with:

$$Ve = Va - \int_o^t \frac{Fa + Id \, dv/dt + PL - RL}{Iv} \, dt$$

where dt=an interval of integration;

means for providing a feed-forward signal Fs representative of at least a portion of an inertial force to be simulated by the PAU in accordance with:

$$Fs = (Iv - Id) \, Ac$$

where:

$$Ac = \frac{Fa + Id \, dV/dt + PL - Rl}{Iv}$$

and means responsive to Ve and Fs for controlling the PAU.

12. The dynamometer of claim 11 wherein FS=(Iv- Id-Idi) Ac where Idi=the dynamometer inertia inside of a control loop.

13. The dynamometer of claim 12 wherein the out-of-loop inertia signal Id further includes an inertia of a rotating mass of the vehicle.

14. The dynamometer of claim 13 wherein Fs represents a force which is within a range of about 10% to 100% of an inertial force to be simulated by the PAU.

15. The dynamometer of claim 14 wherein Fs represents a force which is about 100% of the inertial force to be simulated by the PAU.

16. The invention of claim 14 wherein the road load signal generating means is responsive to the speed achieved signal and provides a road load signal in accordance with:

$$RL = Av + BvV + CvV^2 + DvW$$

where:

RL=the road load signal;

V=the speed achieved signal; and

W=vehicle weight; and

Av, Bv, Cv, and Dv are constants.

17. The invention of claim 16 wherein the parasitic loss signal generating means in response to the speed achieved signal provides a parasitic loss signal in accordance with:

$$PL = Ad + BdV + CdV^2 + DdV^3$$

where:

V=the speed achieved signal; and

Ad, Bd, Cd and Dd are dynamometer parasitic loss constants with the vehicle in place.

18. The invention of claim 17 wherein the PAU is an electric motor.

19. In a method for simulating the inertia and road load forces for motor vehicles on a chassis dynamometer installation, the dynamometer installation including at least one driven roll for engaging driven wheels of the vehicle, at least one power supplying and/or absorbing unit, PAU, connected to the driven roll, force sensing means for providing a measured force signal Fm representative of a force applied to or received from the vehicle wheels by the driven roll, minus a forces attributable to parasitic losses associated with the dynamometer and an out-of-loop inertia of the dynamometer; velocity sensing means for providing a velocity signal Va representative of the speed of the roll; means for providing a roll acceleration signal As; inertia signal generating means for providing a signal Iv representative of a simulated inertia for the vehicle under test, road load signal generating means for providing a road load signal RL representative of the road load forces of the vehicle under test, parasitic loss signal generating means for providing a parasitic loss signal representative of the forces attributable to the parasitic losses of the dynamometer and vehicle, the method comprising:

a) actuating the power supplying and/or absorbing unit coupled to the roll;

b) generating a velocity error signal in accordance with:

$$Ve = Va - \int_o^t \frac{Fm + PL - RL}{Iv} \, dt$$

where:
 Fm=the measured force signal;
 PL=the dynamometer parasitic loss signal;
 RL=the road load signal;
 dt=interval of integration;
 Iv=the vehicle inertia signal; and
 Va=the measured velocity signal;

c) generating a feed-forward signal representative of at least a portion of the simulated inertia force required from the PAU; and d) controlling the PAU in accordance with the velocity error signal and the feed-forward signal.

20. The method of claim 19 wherein $$Ve = Va = \int_o^t \frac{Fm + Id \, dv/dt + PL - RL}{Iv} \, dt$$

where:
 Id=the out-of-loop inertia of the dynamometer.

21. The method of claim 20 wherein the feed-forward signal represents a force which is within a range of 10–100% of the inertial force to be simulated by the PAU.

* * * * *

UNITED STATES PATENT AND TRADEMARK OFFICE
CERTIFICATE OF CORRECTION

PATENT NO. : 5,465,612

DATED : November 14, 1995

INVENTOR(S) : John T. La Belle

It is certified that error appears in the above-identified patent and that said Letters Patent is hereby corrected as shown below:

Column 2, line 50, "Technicalpaper" should read --Technical Paper--.

Column 4, line 66, delete "8".

Column 5, line 4, after "d.c. motor" insert --24.--.

Column 6, line 9, to correct a grammatical error, after "dynamometer," insert --and--.

Column 6, line 61, to correct a grammatical error, "a" should read --an--.

Column 8, line 51, to correct a grammatical error, "forces" should read --force--.

Signed and Sealed this

Fourth Day of June, 1996

Attest:

BRUCE LEHMAN

Attesting Officer

Commissioner of Patents and Trademarks